(12) United States Patent
Kano et al.

(10) Patent No.: US 6,522,549 B2
(45) Date of Patent: Feb. 18, 2003

(54) NON-CONTACTING TYPE IC CARD AND METHOD FOR FABRICATING THE SAME

(75) Inventors: Kenichi Kano, Miyagi (JP); Kimitaka Nishimura, Miyagi (JP); Kyoko Obata, Miyagi (JP); Takao Kudo, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/961,880

(22) Filed: Sep. 24, 2001

(65) Prior Publication Data

US 2002/0060903 A1 May 23, 2002

(30) Foreign Application Priority Data

Sep. 29, 2000 (JP) .......................... 2000-301404

(51) Int. Cl.[7] .................. H05K 1/00; G06K 19/067; B32B 31/14
(52) U.S. Cl. .................. 361/737; 235/488; 156/292; 257/679; 174/256
(58) Field of Search .................. 361/737, 752, 361/736, 748, 760; 257/679; 174/256, 258; 428/209, 901; 29/830, 846; 427/96; 156/153, 154, 292; 235/492, 487, 488, 490, 489

(56) References Cited

U.S. PATENT DOCUMENTS

| | | | | |
|---|---|---|---|---|
| 4,086,114 A | * | 4/1978 | Karol | ................. 156/153 |
| 4,350,545 A | | 9/1982 | Garabedian | |
| 4,855,583 A | * | 8/1989 | Fraser et al. | ................. 235/492 |
| 5,574,470 A | * | 11/1996 | de Vall | ................. 343/895 |
| 5,617,297 A | * | 4/1997 | Lo et al. | ................. 361/737 |
| 5,786,988 A | * | 7/1998 | Harari | ................. 361/749 |
| 5,879,502 A | * | 3/1999 | Gustafson | ................. 156/292 |
| 5,894,048 A | | 4/1999 | Eckart et al. | |
| 6,024,285 A | * | 2/2000 | Mish | ................. 235/492 |
| 6,036,099 A | * | 3/2000 | Leighton | ................. 235/488 |
| 6,095,424 A | * | 8/2000 | Prancz | ................. 235/492 |
| 6,195,054 B1 | * | 2/2001 | Washino et al. | ................. 343/702 |
| 6,288,905 B1 | * | 9/2001 | Chung | ................. 361/771 |
| 6,357,664 B1 | * | 3/2002 | Zercher | ................. 235/488 |

FOREIGN PATENT DOCUMENTS

DE    19617621 A1    11/1997

* cited by examiner

*Primary Examiner*—David Martin
*Assistant Examiner*—Dameon E. Levi
(74) *Attorney, Agent, or Firm*—Sonnenschein, Nath & Rosenthal

(57) ABSTRACT

The swelling in the surface of an IC card due to occluded pneumatic foams is eliminated by providing a novel IC card, which is comprised of a substrate mounting an IC chip and an antenna circuit, and wherein the substrate is sandwiched at least between a pair of films, and the pair of the films are provided with an uneven pattern made of small grooves formed at least on one surface thereof opposing the substrate.

19 Claims, 18 Drawing Sheets

3a(3b)

3a(3b)

NON-CONTACTING TYPE IC CARD AND METHOD FOR FABRICATING THE SAME

RELATED APPLICATION DATA

The present application claims priority to Japanese Application(s) No(s). P2000-301404 filed Sep. 29, 2000, which application(s) is/are incorporated herein by, reference to the extent permitted by law.

1. Field of the Invention

The present invention relates to an IC card and method for fabricating such an IC card, and in particular, the present invention relates to a non-contacting type IC card having an uneven surface made of a plurality of small grooves for degassing air.

2. Description of the Related Art

Conventionally, personal ID (IDentification) cards for identifying individuals carrying data based on a magnetic or an optical method have been widely used as a credit card and the like. However, as the ID cards become popular, tampered data and forged cards are circulating frequently, and thereby actually increasing the number of persons who suffered damages or the like due to such forged cards, and thus raising social problems with respect to the security of personal information. Therefore, recently, an IC (Integrated Circuit) card carrying a built-in IC chip is drawing attention as suitable for personal data management, because the IC card can store a larger capacity of information and cryptographic data.

Such a conventional IC card has usually electrically connectable mechanical connection terminals for data exchange between a built-in IC circuit thereof and an external data processing unit. Therefore, there have been various problems such as securing of a hermetic seal of the IC circuit, a countermeasure against electrostatic destruction, a deficient contact between terminal electrodes, a complicated mechanism of a read/write apparatus and the like. Further, as manual handling of the IC card by the user to insert into the card read/write apparatus is required in any case, thus such operations. are decreased in efficiency and simplicity thereof depending on a certain filed of application. Therefore, a realization of a non-contacting type IC card has been expected for a long time. The non-contacting type IC card can be used in a portable state without the need of complex manual handling and is capable of exchanging data with a remotely located data processing unit.

Hence, such non-contacting type IC card having an antenna for handling electromagnetic waves and an IC chip incorporating a memory and an arithmetic function are developed in a card shape made of plastic. This IC card is intended to be used by driving its IC chip with an induced electromotive power that is induced in the antenna installed within the card, and energized by an external electromagnetic wave supplied from an external reader/writer apparatus. Accordingly, this type of card does not require any mechanical contacts to be connected to the external device. Further, no battery is required in the card, thereby providing an excellent card having superiority in activity. The necessity of such non-contacting type IC cards having visible identification display function and security control function by encrypted electronic information is increasing more and more.

As indicated in FIGS. 26 and 27, this type of IC card 100 is manufactured by sandwiching a substrate 101 having an IC chip mounted thereon between a pair of protective covering members 102a and 102b, and bonding and sealing the same, for example, with a thermoplastic adhesive or the like. However, because the conventional bonding process using thermoplastic adhesives is performed by directly applying the adhesives on the protective covering members 102a and 102b, a vacuum degassing of air between the substrate 101 and the protective covering members 102a, 102b could not be well controlled. Therefore, pneumatic foams 103 are apt to be generated and remained, for example, between the substrate 101 and the protective covering members 102a or 102b as shown in FIG. 26. As a result, there exist swellings 104 on the surfaces of the IC card 100 due to the pneumatic foams 103 as shown in FIG. 27. This results in serious defects and problems in the quality of the IC card 100.

Conventionally, it is provided a lamination process of IC card component members provided on sheets each cut in a so-called page size (A3 size) on which 18 pieces of IC cards are simultaneously assembled. In this case, in order to prevent the occurrence of such pneumatic foams 103, a vacuum degassing process is applied for degassing air from four corners thereof after the lamination process for approximately 60 to 120 seconds, but this substantially lowers the productivity of the IC cards. Furthermore, even after the vacuum degassing process of the lamination collated members, some pneumatic foams tend to remain partially between the lamination members. This has resulted in a plurality of swells on the surface of the IC card after a hot press lamination bonding, thereby lowering the productivity down to 20 to 50%.

Conventionally, an adhesive sheet that is a thermoplastic adhesive or a thermoplastic resin sheet used for lamination and bonding between an antenna substrate and protective covering members made of, for example, a resin sheet are manufactured by a general-purpose film forming apparatus, and most of them are flat adhesive sheets with smooth surfaces. When this flat adhesive sheet is used, the pneumatic foams tend to be generated between the lamination component members. In particular, the softer the adhesive sheet is, the more sagging the sheet portions to be laminated become, thereby causing a plurality of the pneumatic foams being formed in the sagging portions of the lamination and between a plurality of the lamination members. Accordingly, after the card lamination bonding, the sagging portions result in a plurality of partial swellings on the IC card surface to cause problems and defects.

SUMMARY OF THE INVENTION

The present invention has been contemplated to solve the above-mentioned problem associated with the prior art, and a feature of the invention is to provide an IC card carrying no swelling on the card surface resulting from the pneumatic foam.

According to the present invention, the IC card is an integrated circuit mounted card that has an IC chip and an antenna circuit on a substrate, and the substrate is interposed between at least a pair of films having an uneven pattern made of small grooves for degassing air.

In the IC card according to the invention as described above, because of the providing the uneven pattern made of small grooves formed at least on one surface of each of the pair of the films opposing the substrate, residual air remaining between the substrate and the films is caused to be discharged to the outside through this uneven pattern made of small grooves upon fabrication the IC card.

In the method for fabricating the IC card of the present invention, uneven patterns made of small grooves are formed on a pair of films to be attached to both surfaces of a card substrate, so that air residing between the substrate and the films are degassed to outside through these grooves.

BRIEF DESCRIPTION OF THE DRAWINGS

Other features and advantages of the invention would become apparent from the following discussion of the accompanying drawings, wherein.

PREFERRED EMBODIMENTS OF THE INVENTION

Preferred embodiments of the invention will be described more particularly in the following with reference to the accompanying drawings.

Figure 1:
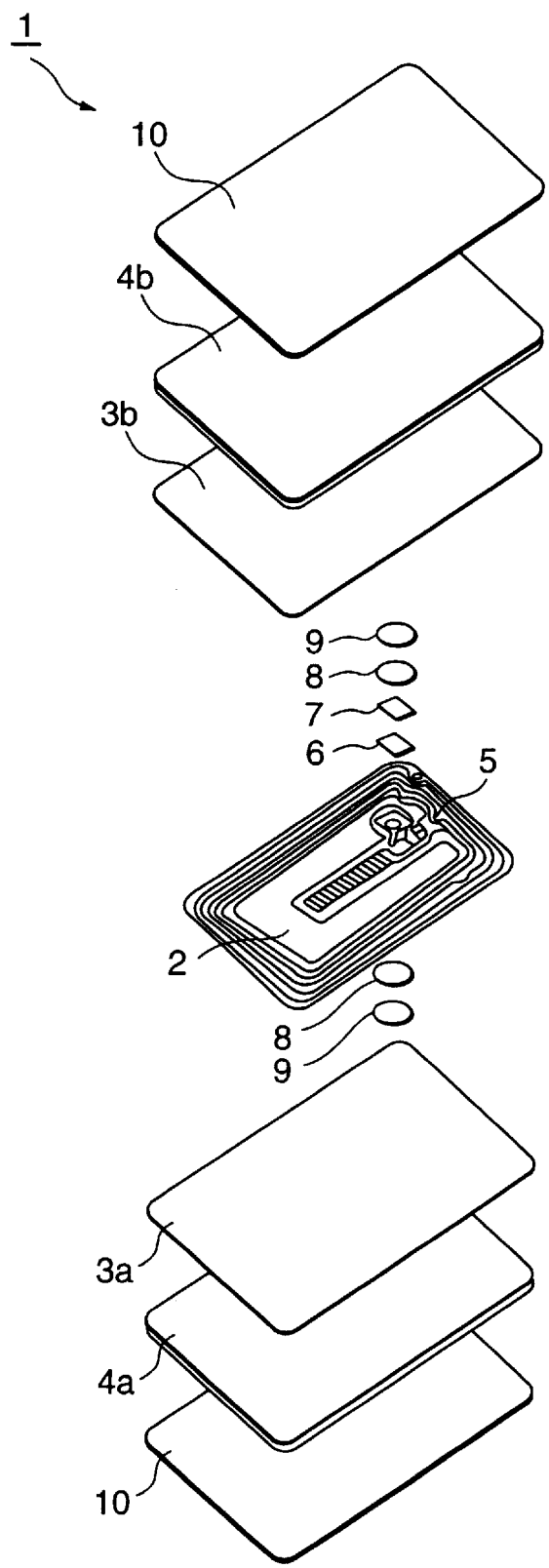
FIG. 1 is a diagram showing exploded lamination components of an example of an IC card according to the invention.
Figure 2:
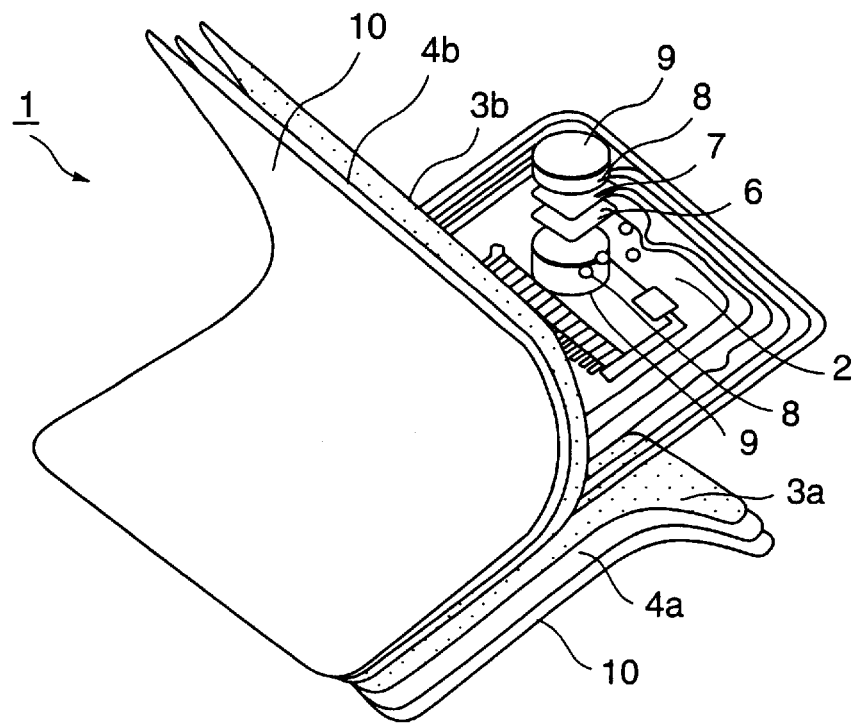
FIG. 2 is a diagram showing a part of the exploded lamination components of the IC card according to the invention.

An example of constructions of an IC card 1 according to an embodiment of the invention is shown in FIGS. 1 and 2, and a size of the IC card is about 85 mm×55 mm, for example. In this IC card 1, an antenna substrate 2 thereof is sandwiched between a pair of outer protective covering members 4a and 4b via respective adhesive sheets 3a and 3b. The antenna substrate 2 is comprised such that a capacitor an d an antenna circuit 5 are formed by patterning on a film made of, for example, a PET (Poly-Ethylene Terephthalate) resin, polyimide resin or the like. This antenna circuit 5 is made of, for example, aluminum film or the like. A thickness of this antenna substrate 2 is 15 μm, for example.

Figure 3:
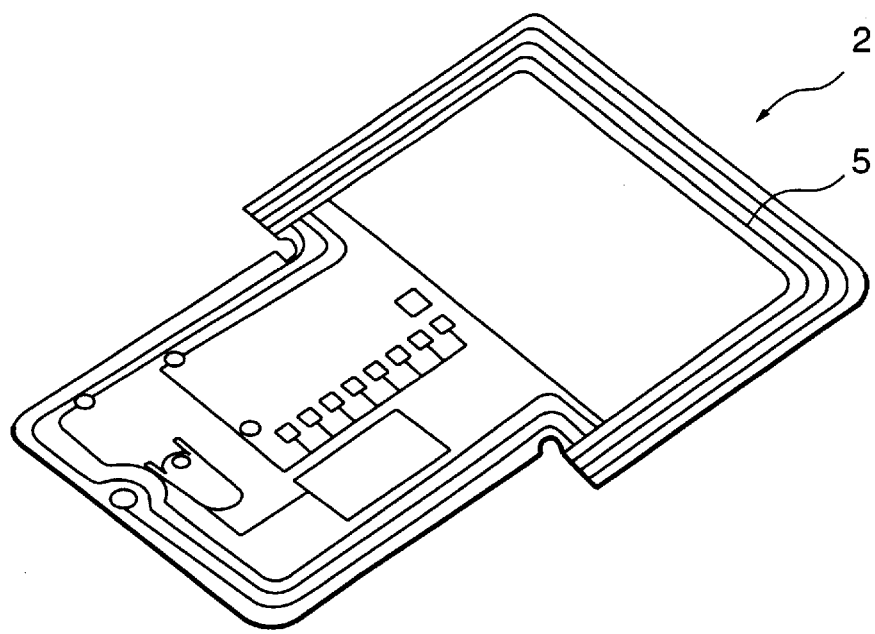
FIG. 3 is a perspective view of an exemplary antenna substrate of a half size.
Figure 4:
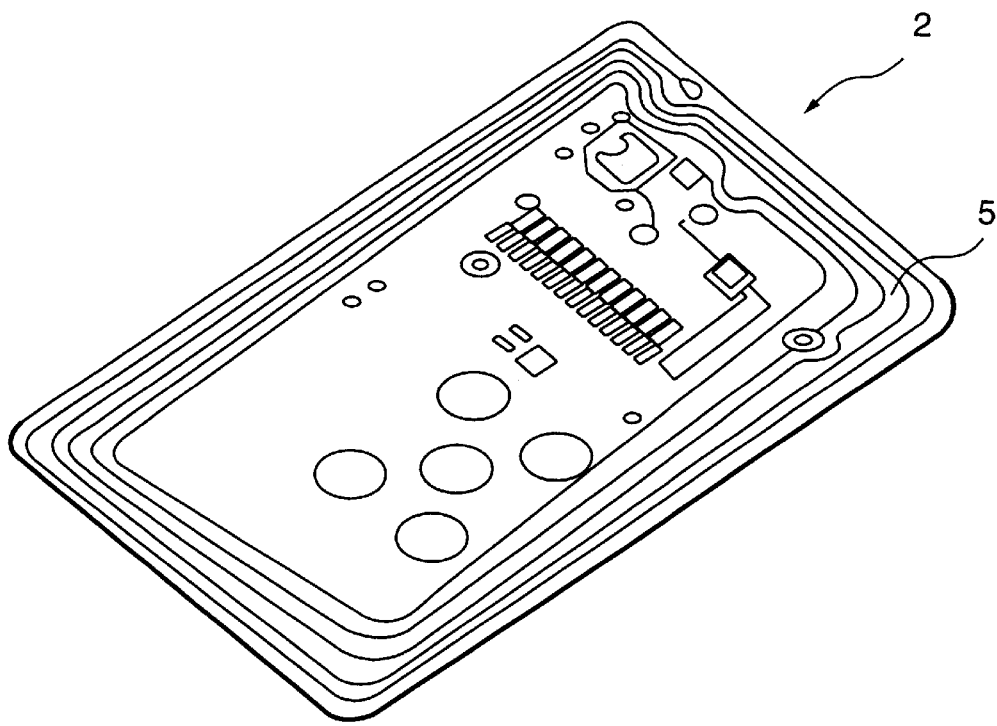
FIG. 4 is a perspective view of an exemplary antenna substrate of a full size.

The antenna substrate 2 is provided in two different types of a half sized pattern as shown in FIG. 3, and a fill sized pattern as shown in FIG. 4. The half sized patterned antenna substrate 2 is manufactured in such a manner that at the time of fabrication thereof, its substrate in a half size of a required antenna pattern is manufactured, then after that, it is folded open for forming into the antenna substrate 2 of a card size (85 mm×55 mm). Because the substrate 2 can be manufactured in the half size of the required antenna size, a cost-down of materials can be achieved. On the other hand, the full sized antenna substrate 2 which has individual antenna circuit 5 formed on both surfaces of a card sized substrate 2 is provided for enhancing characteristics of the antenna.

In the IC card 1 as shown in FIGS. 1 and 2, a full sized antenna substrate 2 is used. Then, at a predetermined position on this antenna substrate 2, an IC chip 7 is pasted via an ACF (An-isotropic Conductive Film) conductive film 6.

As this ACF conductive film 6 having double-sided adhesive layers is used. A thickness of this ACF conductive film 6 is 15 μm, for example. The IC chip 7 has a planar and rectangle shape of 4.3 mm×4.0 mm, and a thickness of, for example, 175 μm.

Then, the IC chip 7 bonded on the antenna substrate 2 is hermetically sealed with adhesive materials 8 from both sides of the substrate 2 in order to guarantee for its conductivity characteristic to be maintained, and is further reinforced and protected with a reinforcement plate 9.

The adhesive material 8 is made of, for example, a bisphenol type epoxy resin, a filler-containing adhesive or any other appropriate sealing materials. A thickness of this adhesive material 8 is 70 μm, for example. The reinforcement plate 9 is made of, for example, a stainless steel disc, a ceramic disc, or any other appropriate reinforcement materials. A thickness of this reinforcement plate is 50 μm, for example.

Adhesive sheets 3a and 3b are made of, for example, a thermoplastic resin sheet, a thermoplastic adhesive, a two-liquid epoxy adhesive or the like. A thickness of this adhesive sheets 3a, 3b is 120 μm, for example. It should be noted here that according to the IC card embodying the invention, the adhesive sheets 3a and 3b are provided on surfaces with uneven patterns made of small grooves for degassing air.

The outer protective cover members 4a, 4b are made of, for example, a PET-G, an ABS resin, a vinyl chloride or the like. A thickness of these protective cover members is 125 μm, for example. A printed layer is made of, for example, a pigment ink transparent varnish topcoat material, a thermal leuco printed layer or the like. A thickness of this printed layer 10 is 2 μm, for example.

The IC card 1 having the above-mentioned construction is manufactured by laminating the outer protective cover member 4a, the adhesive sheet 3a, the antenna substrate 2 on which the IC chip 7 is mounted, the adhesive sheet 3b, and the outer protective cover member 4b, and then hot pressing and bonding these constituent members.

At this time, air that is trapped between the laminated component members cannot be removed completely, and after a hot press lamination, dispersed pneumatic foams of residual air between these lamination component members produce a plurality of swells on the surface of the IC card, thereby lowering yield of manufacture.

Figure 5:
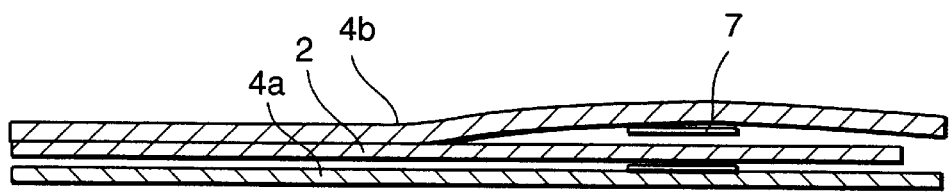
FIG. 5 is a cross-sectional view indicating a state in which air resides as occluded between lamination component members.

FIG. 5 is a diagram showing a state of residual pneumatic foams occluded between the lamination component members at the time of the lamination hot pressing because of an incomplete degassing therefrom. In this state, if hot pressed, for example, at 110° C.–200° C., a pneumatic foam portion undergoes dispersion compression.

Then, in a cooling process to follow, there occurs a large difference in post-cooling adhesions between a portion in which its component members are bonded integrally because of absence of residual air and a portion in which its component members are bonded incompletely because of a presence of residual air. Then, in the portion having a different post-cooling adhesion, there occurs a shrinkage that deteriorates a planarity of the surface, thereby failing to obtain a smooth surface for the card, which is most important to the IC card.

In particular, in a case which will be described later in more detail, where sheets of lamination components members in a so-called cutout page size assembling 8 to 18 pieces of cards on one sheet are laminated, collated and hot pressed for bonding, because of an increased area for lamination of the component sheets, a probability of inclusion of pneumatic foams between the laminated component members increases.

Figure 6:
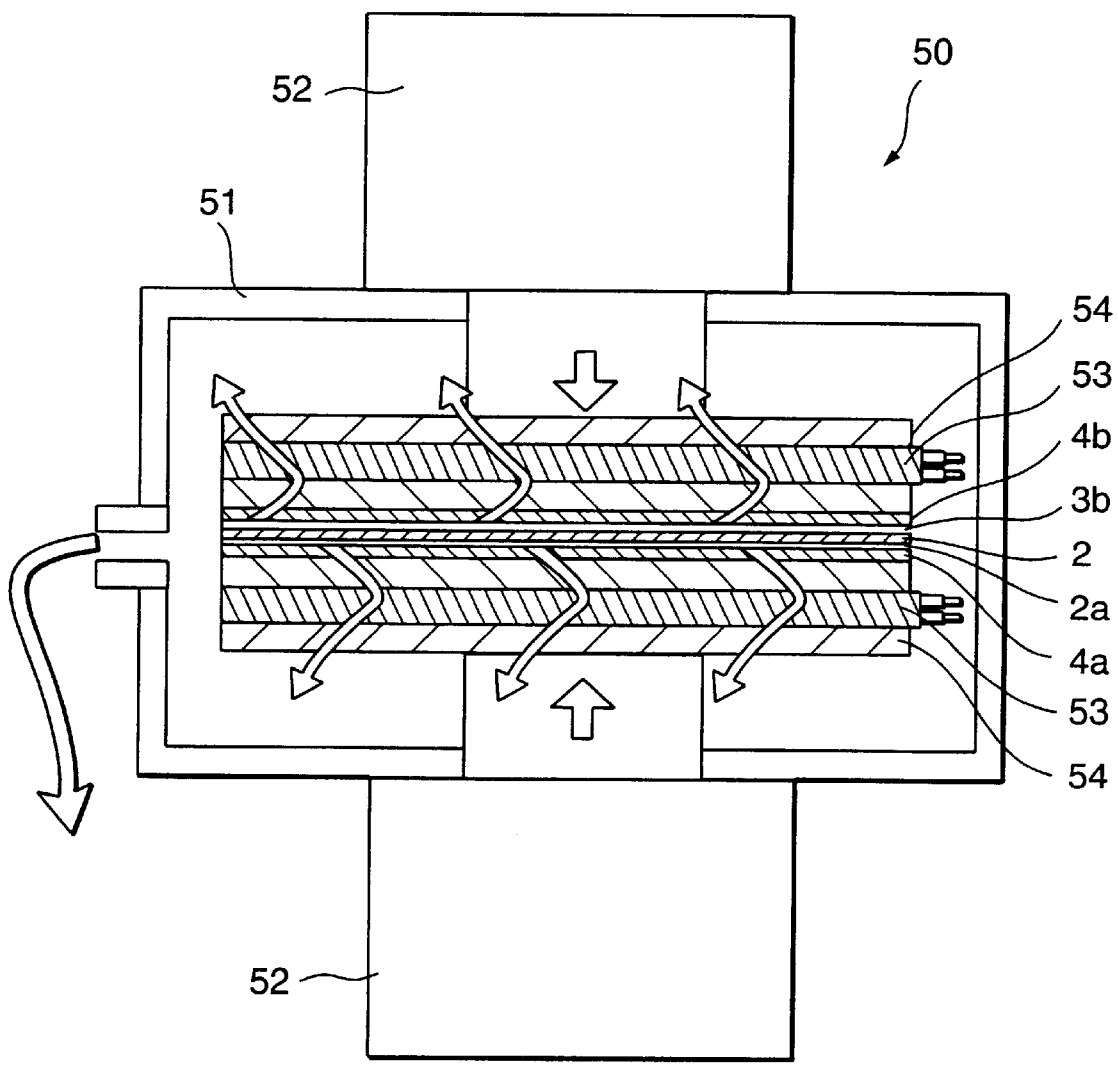
FIG. 6 is a diagram showing a state under vacuum; degassing for discharging residual air remaining between the lamination components.

At present, a collated product of the lamination: component members in the cutout page size is applied with a vacuum degassing from the lamination component members for 5 to 30 minutes in a vacuum chamber 51 using a special vacuum press 50 having a pressure cylinder 52 as shown in FIG. 6, followed by hot pressing between hot plates 54 provided with heaters 53 under vacuum. Its air bubble (pneumatic foam) between the lamination component members becomes maximum (a maximum convex) at a portion of the IC chip 7, and a residual air present in a gap in the periphery of this convex portion cannot be removed completely even by the above-mentioned vacuum degassing, therefore, the air bubble in this gap is dispersed by compression under pressure between the component members. Then, after hot press bonding, this dispersed air produces pneumatic foams and swelling on the surface of the card thereby increasing a probability to turn out defectives.

Thereby, according to the present invention, an uneven pattern made of small grooves is formed on both surfaces of the adhesive sheets 3a and 3b that are component members of the IC card. By providing the uneven pattern made of small grooves on the both surfaces of the adhesive sheets 3a and 3b, the residual air occluded between the lamination component members is ensured to discharge outside passing through a concave or groove portion in the uneven pattern. Thereby, because the residual air occluded between the lamination component members is eliminated at the time of hot pressing, a smooth-surfaced IC card 1 free from any swelling on the surface of the card due to dispersed pneumatic foams can be fabricated.

Figure 7:
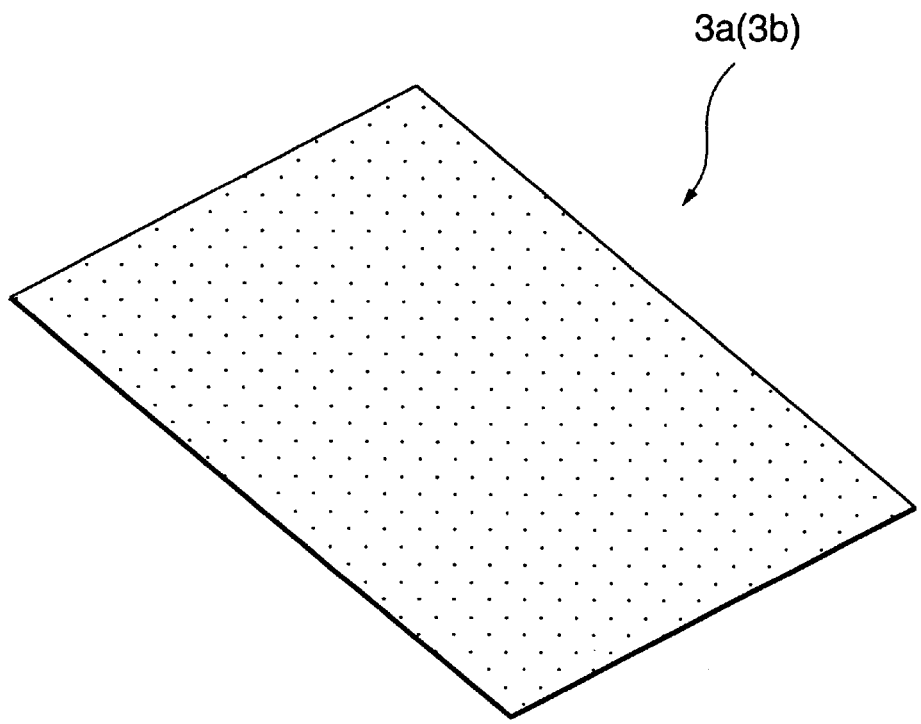
FIG. 7 is a perspective view of an example of constructions of uneven pattern made of small grooves to be formed on the surface of an adhesive sheet.

As an uneven pattern to be formed on the adhesive sheets 3a and 3b, there is, for example, a so-called satin finish pattern formed on the surfaces of the adhesive sheets 3a and 3b as shown in FIG. 7. By providing the uneven pattern of the satin finish formed on the surfaces of the adhesive sheets 3a and 3b, the residual air occluded between the lamination component members is exhausted outside passing through a groove portion in this satin finish pattern.

Figure 8:
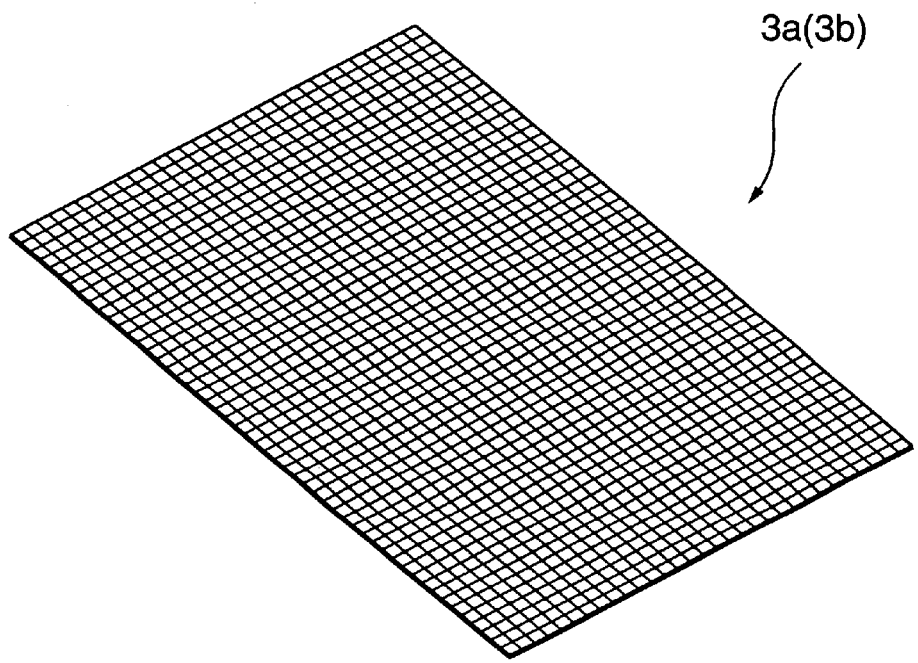
FIG. 8 is a perspective view of another example of constructions of uneven pattern made of small grooves to be formed on the: surface of the adhesive sheet.
Figure 9:
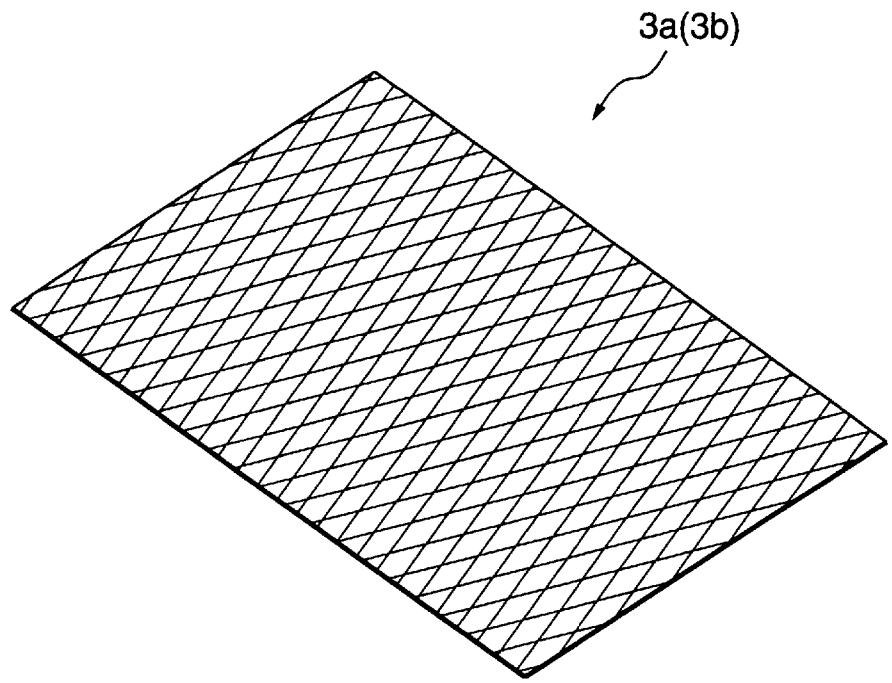
FIG. 9 is a perspective view of still another example of constructions of uneven pattern made of small grooves to be formed on the surface of the adhesive sheet.
Figure 10:
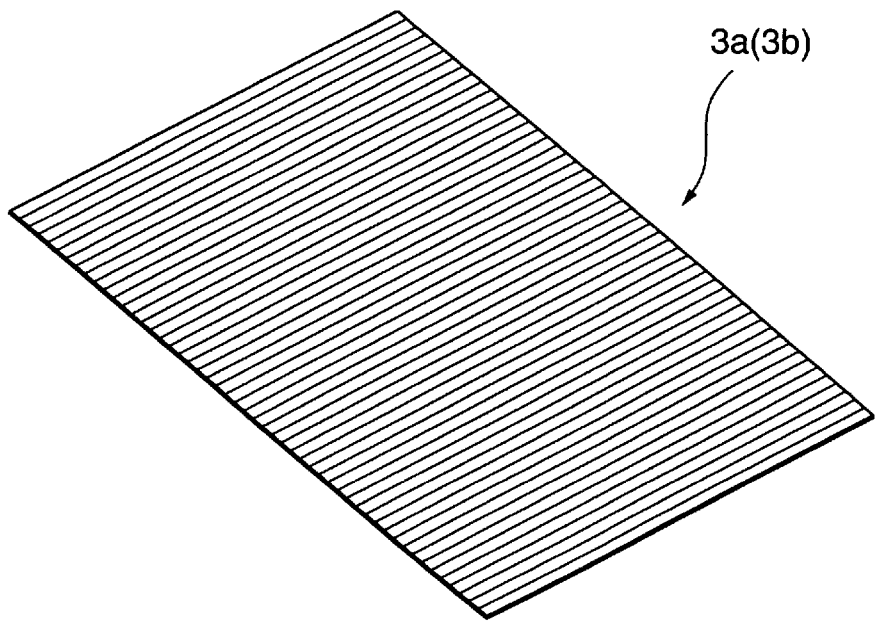
FIG. 10 is a perspective view of a still further example of constructions of uneven pattern made of small grooves to be formed on the surface of the adhesive sheet.
Figure 11:
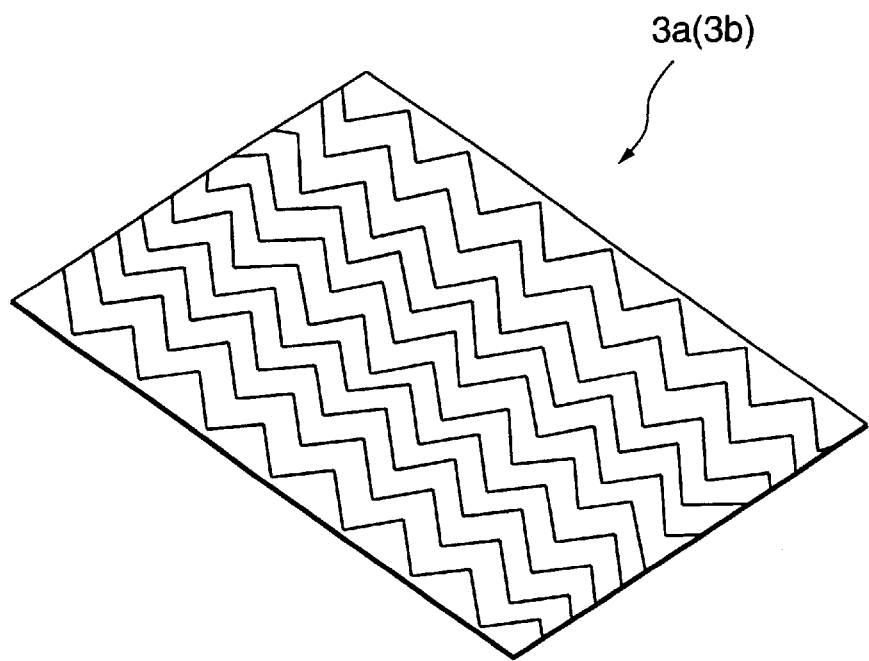
FIG. 11 is a perspective view of still another example of constructions of uneven pattern made of small grooves to be formed on the surface of the adhesive sheet.

As other irregular patterns in addition to the above satin finish pattern to be formed on the surfaces of the adhesive sheets 3a and 3b, there are texture patterns, for example, as shown in FIGS. 8 through 13. FIG. 8 is a Teflon fiber surface transcribed adhesive sheet 3a, 3b (which corresponds to etching patterns Nos. 2 and 6 made by Nihon Etching Co. Ltd.). FIG. 9 is a Teflon fiber cloth pattern surface transcribed adhesive sheet 3a, 3b (which corresponds to etching pattern No. 9, HN451 made by Nihon Etching Co. Ltd.). FIG. 10 is a stripe etching pattern surface transcribed adhesive sheet 3a, 3b (which corresponds to etching pattern Nos. 7 and 9 made by Nihon Etching Co. Ltd.). FIG. 11 is a polygonal line pattern surface transcribed adhesive sheet 3a, 3b (which corresponds to etching pattern No. HN463 made by Nihon Etching Co. Ltd.).

Figure 12:
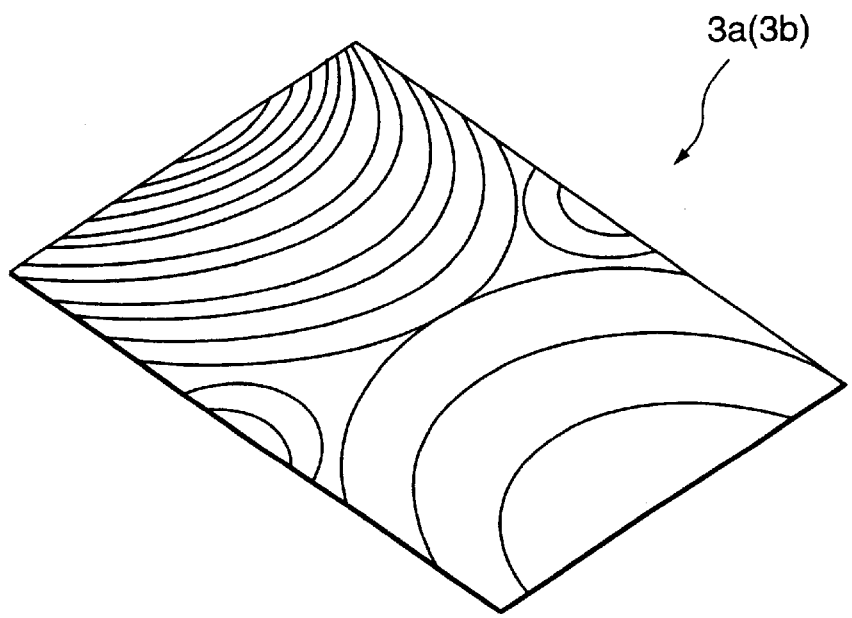
FIG. 12 is a perspective view of still another example of constructions of uneven pattern made of small grooves to be formed on the surface of the adhesive sheet.
Figure 13:
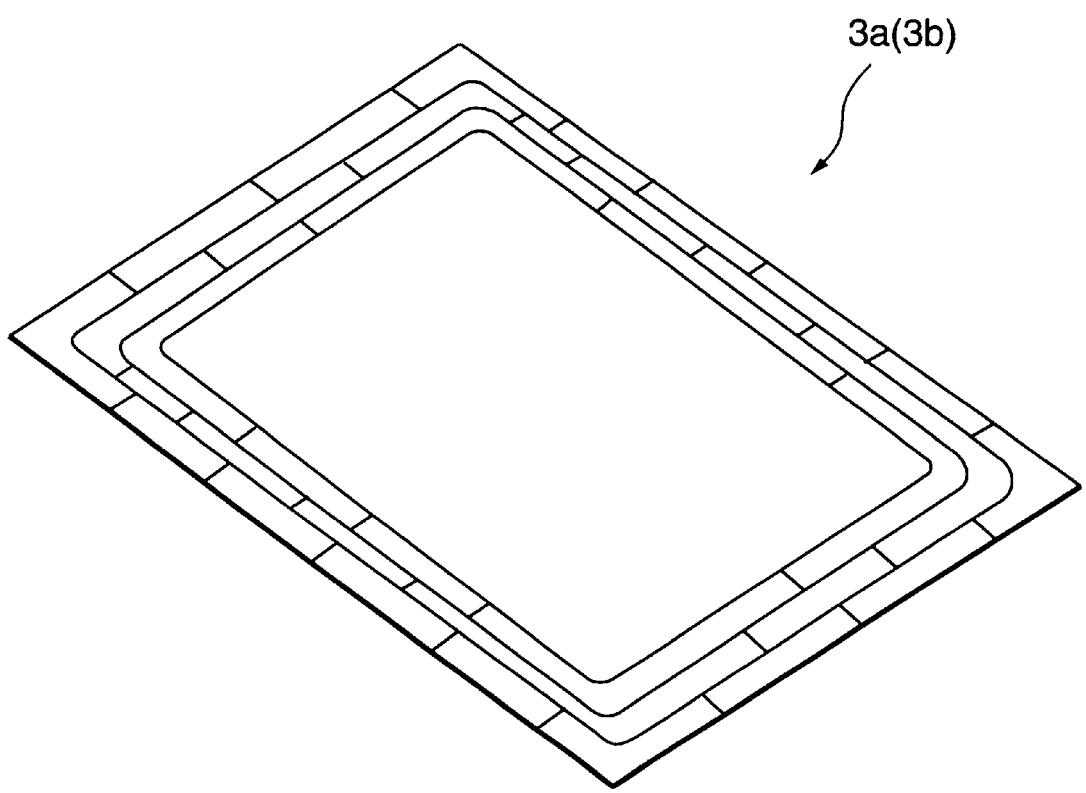
FIG. 13 is a perspective view of a furthermore example of constructions of uneven pattern made of small grooves to be formed on the surface of the adhesive sheet.

Further, FIG. 12 shows a streamline pattern surface transcribed adhesive sheet 3a, 3b (which corresponds to etching pattern No. 8, made by Nihon Etching Co. Ltd.). It should be noted here that the streamline pattern shown in FIG. 12 has a finer line pitch in a portion corresponding to a position of the IC chip 7. This is because, as described above, the pneumatic foams are more likely to be occluded in a periphery of the IC chip 7. By providing the finer line pitch in the portion corresponding to the IC chip, the residual air occluded in the periphery of the IC chip 7 can be removed efficiently. Further, as shown in FIG. 13, an antenna circuit pattern transcribed sheet having its pattern formed in accordance with a respective type of various antenna circuits may be provided as well.

Furthermore, it is preferable for this adhesive sheet 3a, 3b to include a plurality of grooves 11 arranged in stripes in addition to the above mentioned satin finish pattern texture or the like as the uneven pattern made of small grooves thereof. By providing the grooves 11 formed in the stripe pattern, there are such advantages that a degassing process efficiency substantially improves, the pneumatic foams remaining between the component members are removed completely through these grooves, and that a smooth-surfaced IC card 1 without swelling on the surface due to the dispersed pneumatic foams can be obtained.

Figure 14:
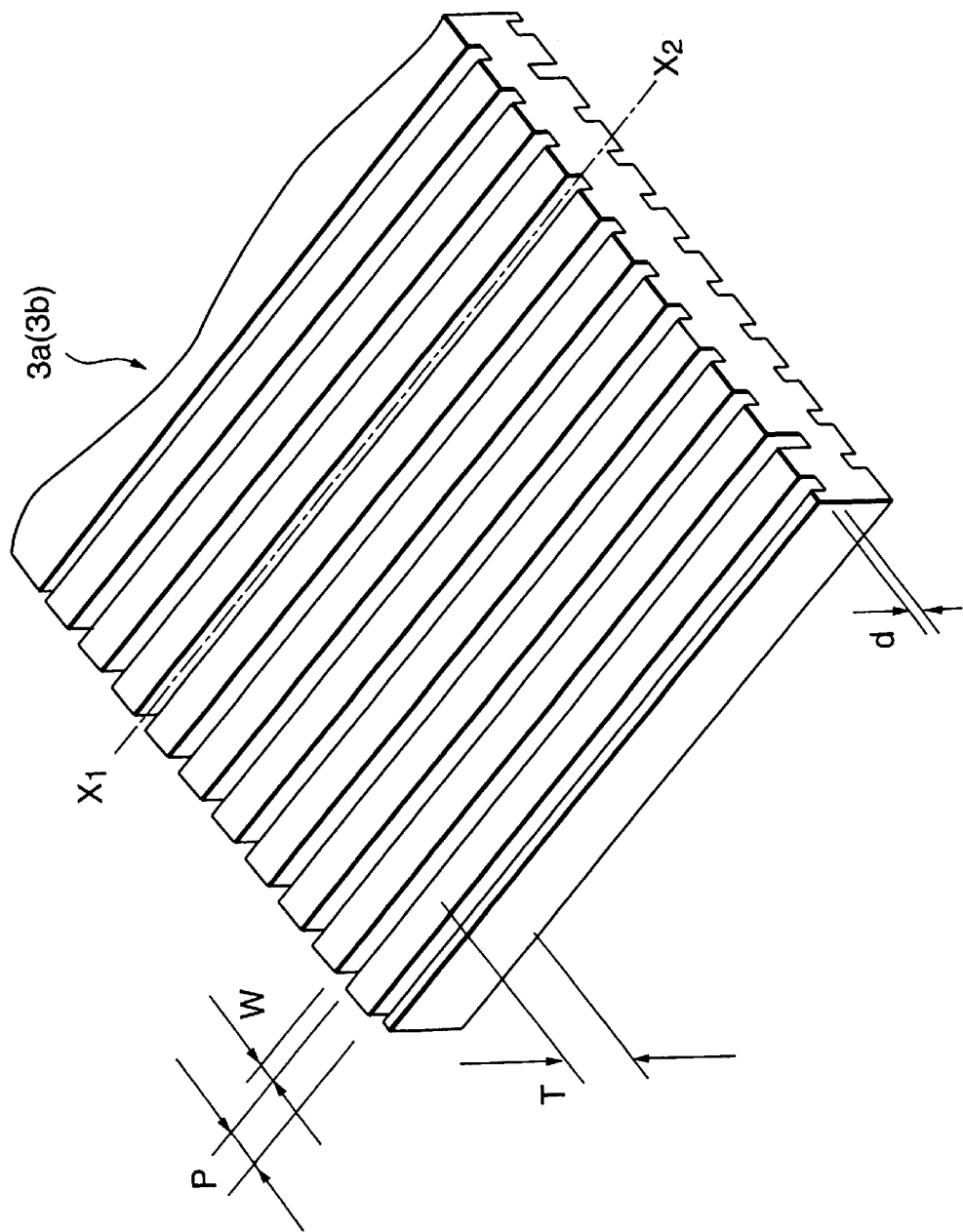
FIG. 14 is a perspective view of a furthermore example of constructions of uneven pattern made of small grooves to be formed on the surface of the adhesive sheet.

With reference to FIG. 14, preferably, this plurality of grooves 11 are formed on the adhesive sheets 3a and 3b having a thickness of, for example, 100 μm to 300 μm such that its width (w) is 20 μm to 300 μm, its depth (d) is 10 μm to 50 μm, and a pitch (p) between grooves is 1 mm to 5 mm.

If values of the width and depth of the grooves 11 are smaller than the values described above, a sufficient degassing process cannot be performed, thereby leaving a probability that some of the pneumatic foams still remain between the component members. On the other hand, if the values of the width and the depth of the grooves 11 are larger than the above-mentioned values, the adhesive sheet 3a, 3b after formation of the grooves thereon loses its toughness (rigidity). Therefore, by setting the values of the width and the dept of the grooves 11 in the above-mentioned ranges, it is ensured for the air occluded between the lamination component members to be exhausted completely, and also for the toughness (rigidity) of the adhesive sheet 3a, 3b after formation of the grooves to be maintained as much as possible.-Further, forming the grooves 11 on the adhesive sheet 3a, 3b becomes easy.

In particular, as for the depth of the grooves 11, if it is shallower than 10 μm, the grooves 11 may be collapsed when hot pressing the laminated component members. If the grooves 11 are collapsed, a passage for degassing is destroyed thereby failing completely to remove the air occluded between the lamination component members. By setting the depth of the grooves 11 in the range from 10 μm to 50 μm, the grooves 11 are ensured not to collapse entirely under hot-press processing of the laminated component members, thereby securing the passage for degassing to be maintained.

Further, preferably, these grooves 11 are formed to become approximately orthogonal relative to a wiring of the antenna circuit 5 that is formed on the antenna substrate 2. By forming the grooves 11 approximately orthogonal to the wiring of the antenna circuit 5, the degassing process can be performed efficiently. By way of example, the antenna circuit 5 is formed approximately along a rectangular perimeter of the antenna substrate 2 as shown in FIG. 4. Thereby, in this IC card 1, the grooves 11 are formed in such a manner that they become approximately orthogonal to a portion of the antenna circuit 5 that is formed along a major line of the antenna substrate 2.

Still further, as shown in FIG. 14, preferably, the grooves 11 formed on both surfaces of respective adhesive sheets 3a, 3b are arranged staggering alternately thereon. By providing the alternately staggering grooves 11 formed on the both surfaces of the adhesive sheets 3a, 3b, the depth of respective grooves 11 can be increased thereby improving the degassing effect.

Figure 15:
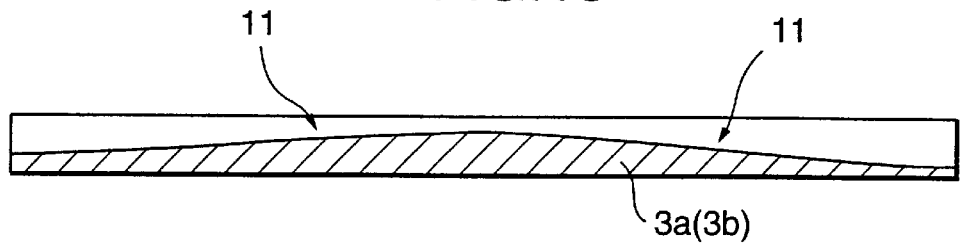
FIG. 15 is a cross-sectional view cut out along line X1–X2 in FIG. 14.

Further, it is also effective to form this groove 11 not in the same depth over its entire length but to have an inclination as shown in FIG. 15 to have a shallow depth in a center portion of the card and to deepen the groove approaching toward the outside thereof. By providing the inclination in the depth of the grooves 11, the residual air occluded between the component members is allowed to be gradually discharged and removed from the center portion to the outside, namely, along the inclination or slope of the grooves 11 at the time of hot pressing of the laminated component members. At this time, because the air is discharged and removed to the outside along the slope of the grooves 11, it becomes easier to eject out the air occluded inside thereby enabling an effective removal of the residual air to be performed.

By way of example, an apex of the slanted groove 11 described above, namely the shallowest depth of the groove, is not necessarily to be in the center of the card. In order to enable an efficient degassing process, a pattern of inclination of the groove 11 can be modified appropriately as required in consideration of specific arrangements in the design of the IC chip 7 and the antenna circuits 5 on the antenna substrate 2.

As described hereinabove, by providing the uneven pattern made of small grooves of the surface textures and/or the grooves 11 on the adhesive sheets 3a and 3b, it becomes possible to exhaust the residual air occluded between the laminated component members. Thereby, after the bonding of the component members by the hot pressing, it is enabled to prevent the occurrence of the pneumatic foams due to the residual air and eliminate the swelling on the surface of the card due to the dispersed pneumatic foams, thereby ensuring for the IC card 1 to be excellent with an excellent smoothness of the surface to be obtained.

However, it should be noted that a convex portion in the periphery of the IC chip 7 mounted on the antenna substrate 2 is where the air is most likely to be occluded. The air occluded in the peripheral portion of the IC chip 7 cannot be removed completely only by providing the texture patterns and/or the grooves 11 formed on the adhesive sheets 3a and 3b.

Figure 16:
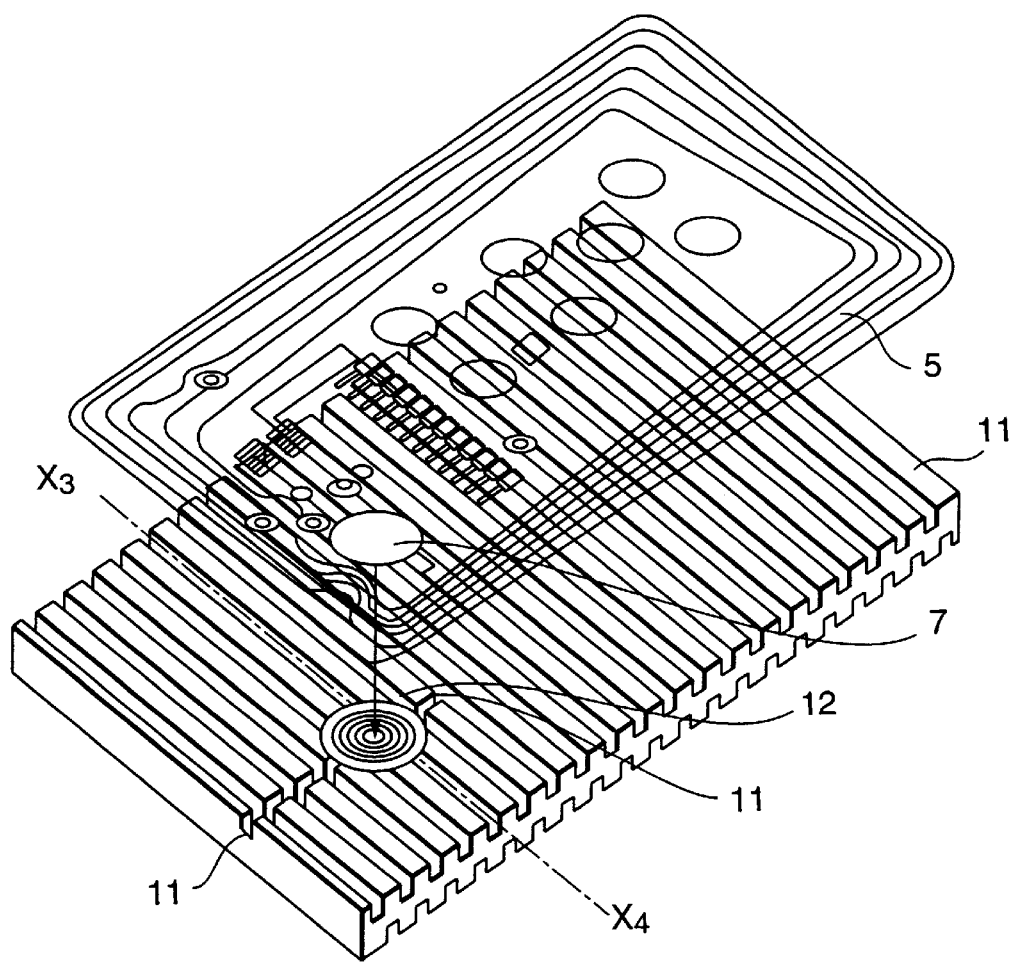
FIG. 16 is a perspective view indicating a state of an adhesive sheet with a recess portion formed therein.
Figure 17:
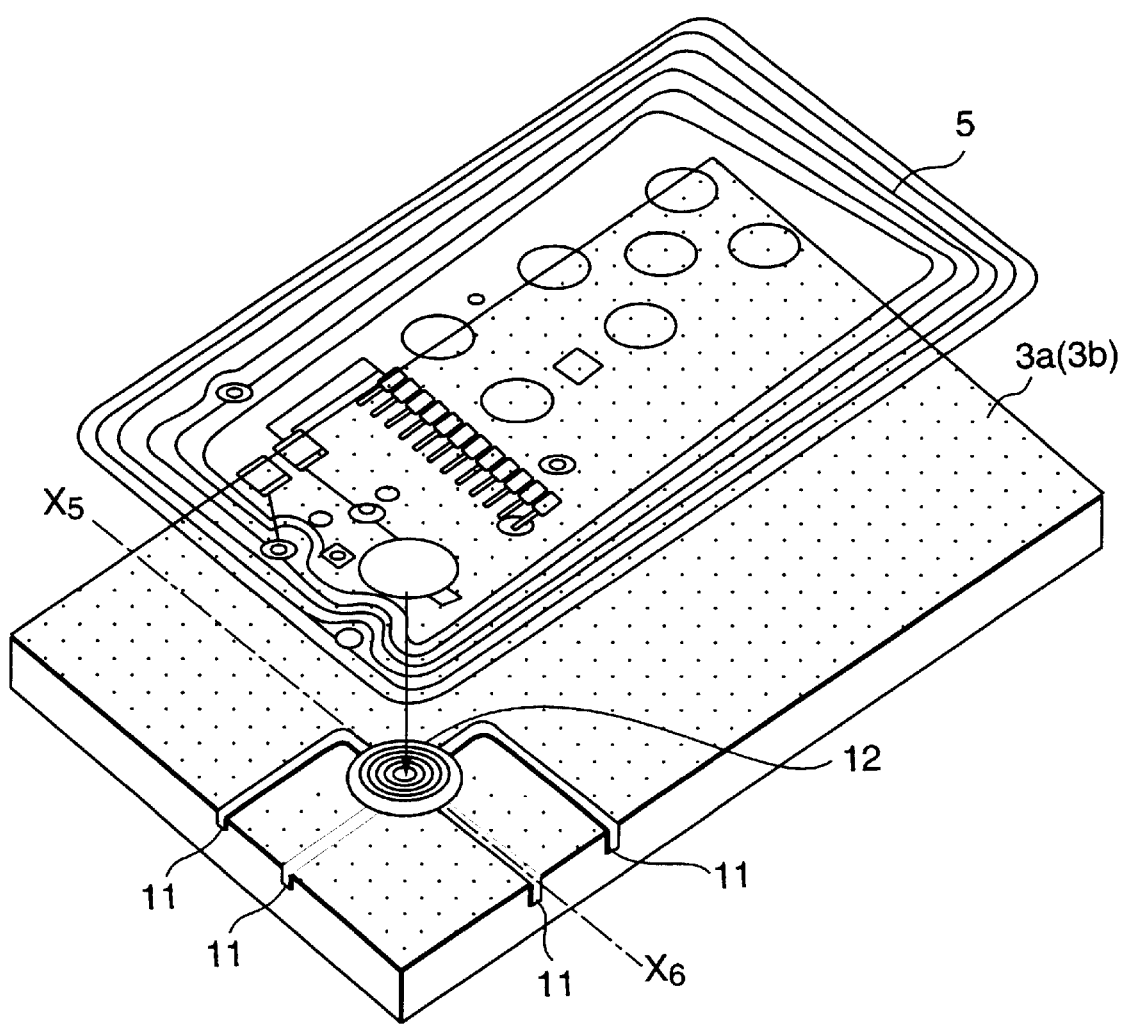
FIG. 17 is a perspective view indicating a state of another adhesive sheet with a recess portion formed therein.

Therefore, according to the invention, as shown in FIGS. 16 and 17, in addition to the above-mentioned surface textures and/or the grooves 11, preferably, a concave portion 12 is provided in a portion of the adhesive sheets 3a, 3b, corresponding to the IC chip 7. By providing the concave portion 12 formed on the adhesive sheets 3a, 3b corresponding to the IC chip 7, the residual air occluded in the periphery of the IC chip 7, which is most difficult to remove, can be evacuated. Thereby, the residual air remaining between the laminated component members is ensured to be released almost completely, thereby, after bonding of the component members by hot pressing, the swelling appearing on the surface of the card due to the pneumatic foams is eliminated almost completely, and thereby enabling to obtain an excellent IC card 1 having an excellent smoothness of the surface.

Further, this concave portion 12 corresponding to the IC chip 7 is required to be communicative with outside via the groove 11 in order to achieve the above-mentioned object to remove the residual air remaining peripheral portion of the IC chip 7.

Still further, as for a shape of the concave portion for the IC chip 7, for example, a conical shape with a raised portion approximately in the center thereof as shown in FIG. 11 is preferred. By providing the conical shape with the raised portion approximately in the center of the concave portion 12 corresponding to the IC chip 7, the residual air occluded in the peripheral portion of the IC chip 7 is allowed to be ejected and removed gradually from the center portion of the concave 12 toward the outside along the inclination of the conical portion during the hot pressing of the laminated component members.

A depth of the concave 12, although it depends on a size of the IC ship 7, is set, for example, in a range from 50 μm to 150 μm at its bottom periphery, and in a range from 0 to 50 μm at its conical apex in the concave 12.

Figure 18:
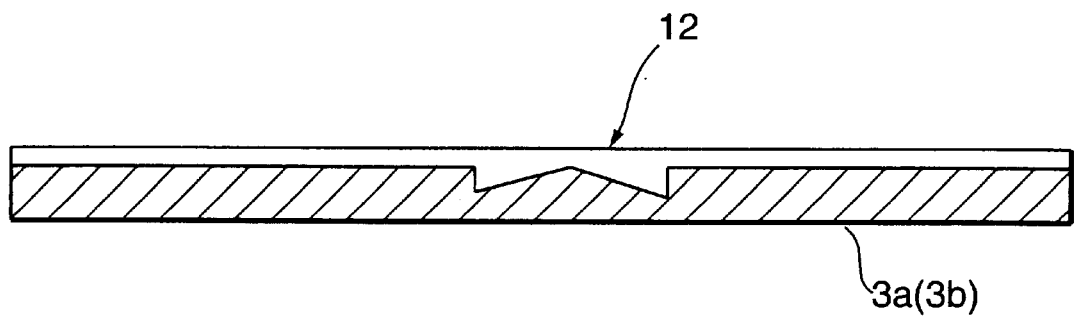
FIG. 18 is a cross-sectional view cut out along line X3–X4 in FIG. 16.

Still more, the shape of the concave 12 is not limited to the conical shape as shown in FIG. 18, but it may have any conical shapes such as a square cone, a triangular cone or the like. Further, a position of the apex of the conical shape is not limited to the center portion of the concave 12, but it may be set at any position other than the center thereof within the range of the concave 12.

Figure 19:
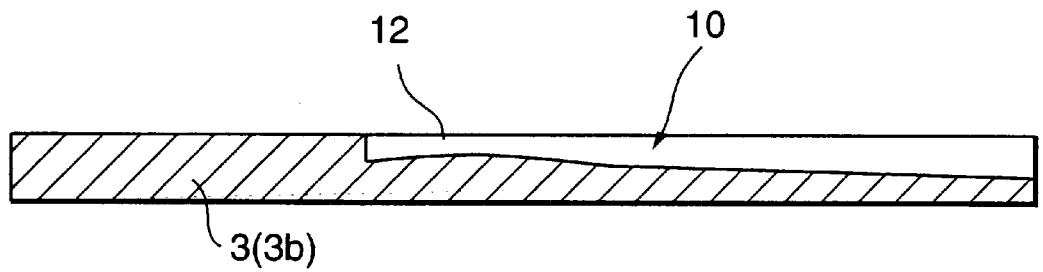
FIG. 19 is a cross-sectional view cut out along line X5–X6 in FIG. 17.
Figure 20:
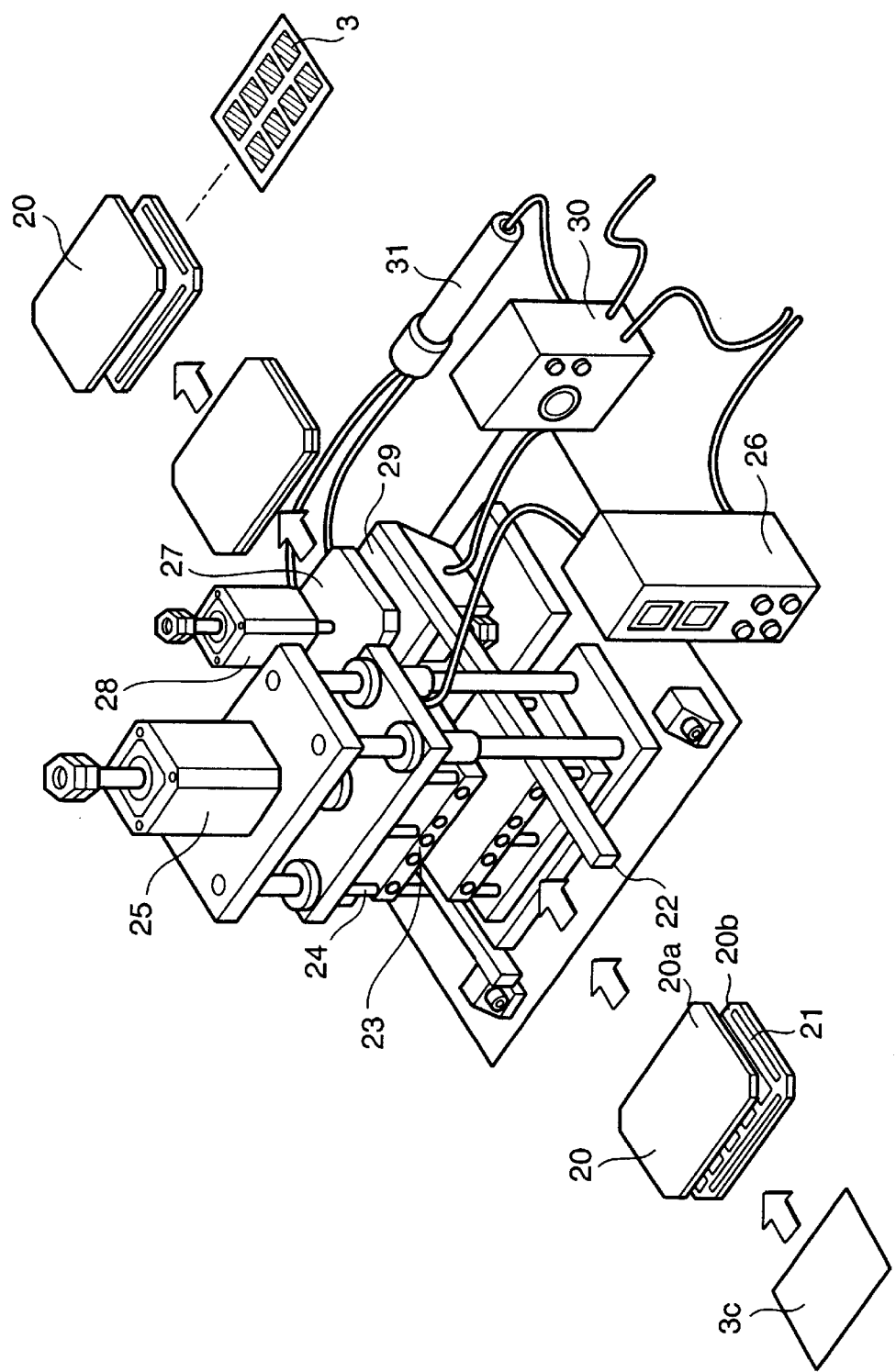
FIG. 20 is a diagram showing an example of hot press machines for forming uneven pattern made of small grooves on the adhesive sheets.

Still further, the groove 11 provided for removing the residual air occluded in the concave portion 12 may be slanted as shown in FIG. 19. By providing the slanted groove 11, because the residual air occluded in the concave portion 12 is discharged outside along the slanted path of the groove 11, it becomes easier to lead out the residual air from the concave portion 12 to the outside thus enabling to remove the residual air more efficiently.

As described hereinabove, in the IC card 1 embodying the invention, because of providing the concave portion 12 formed on the adhesive sheets 3a and 3b corresponding to the position of the IC chip 7, the residual air occluded in the peripheral portion of the IC chip 7, which has been most difficult to remove by prior art, can be removed almost completely. Thereby, the residual air remaining between the laminated component members can be almost completely evacuated, hence, the swelling appearing on the surface of the card due to the dispersed pneumatic foams of the residual air after bonding the laminated component members by hot pressing can be almost completely eliminated, and thereby enabling achievement of an IC card 1 having a superior smoothness in the surface thereof.

Firstly, the adhesive sheet material 3 cut out in a page size on which the uneven pattern to transcribe is set by inserting between an uneven pattern transcribing plate 20 comprising an upper plate 20a and a lower plate 20b. This adhesive sheet material 3 is made of, for example, a thermoplastic adhesive material (hot melt), a thermoplastic resin, or the like. Further, on surfaces of the upper plate 20a and the lower plate 20b facing the adhesive sheet material 3, there are preformed a predetermined uneven pattern made of small grooves to transcribe on the adhesive sheet material 3.

Still further, at least on two corners of the lower plate 20b, there is formed a gap butting portion 21 made of a metal tape having approximately a same thickness as a prescribed product thickness of the adhesive sheet material 3 whereby the adhesive sheet material 3 is set at a position aligned with this gap butting portion 21. Then, the uneven pattern made of small grooves transfer plate 20 in which the adhesive sheet material 3 is inserted is set at a prescribed position in the hot press portion 23 guided by a plate guide 22.

When the uneven pattern transfer plate 20 is set in the hot press portion 23, by depressing an operation start button provided on the hot press portion 23, a hot press plate 24 descends so as to cause the adhesive sheet material 3 and the uneven pattern transfer plate 20 to contact fully over their surfaces under pressure by a pressure cylinder 25. By the way, this hot press plate 24 is preheated to a preset hot press temperature controlled by a control box 26. The hot press temperature and the pressure are transferred to the uneven pattern transfer plate 20 so as to transcribe the predetermined uneven pattern made of small grooves onto the adhesive sheet material 3 by hot pressing.

At this time, in the uneven pattern transfer plate 20, the upper plate 20a is butting against the gap butting portion 21 formed on the lower plate 20b. The adhesive sheet material 3 is stretched under pressure between the lower plate 20b and the upper plate 20a into an adhesive sheet member 3 having a required thickness.

According to this method based on the gap butting between the upper plate 20a and the lower plate 20b, in comparison with a conventional press method based on a plate lot guide method, a uniform thickness and uneven pattern transcribed sheet can be obtained substantially in a simple structure, and with minimized effects on precision due to a thermal conductivity and a heat cycle.

Then, the uneven pattern transfer plate 20 which has undergone the hot press operation is conveyed to a cooling stage 27 along the plate guide 22. The uneven pattern transfer plate 20 conveyed to the cooling stage 27 is sandwiched between cooling plate 29 driven by a cylinder 28 to made contact fully with the surface of the cooling plate 29 so as to be quenched. This cooling plate 29 is cooled in advance to a predetermined temperature by a control box 30 and a cooler 31.

When the uneven pattern transfer plate 20 is opened, the adhesive sheet material 3 that is formed to have a predetermined thickness is transcribed with a predetermined uneven pattern made of small grooves thereon, thus achieving adhesive sheets 3a and 3b.

Figure 21:
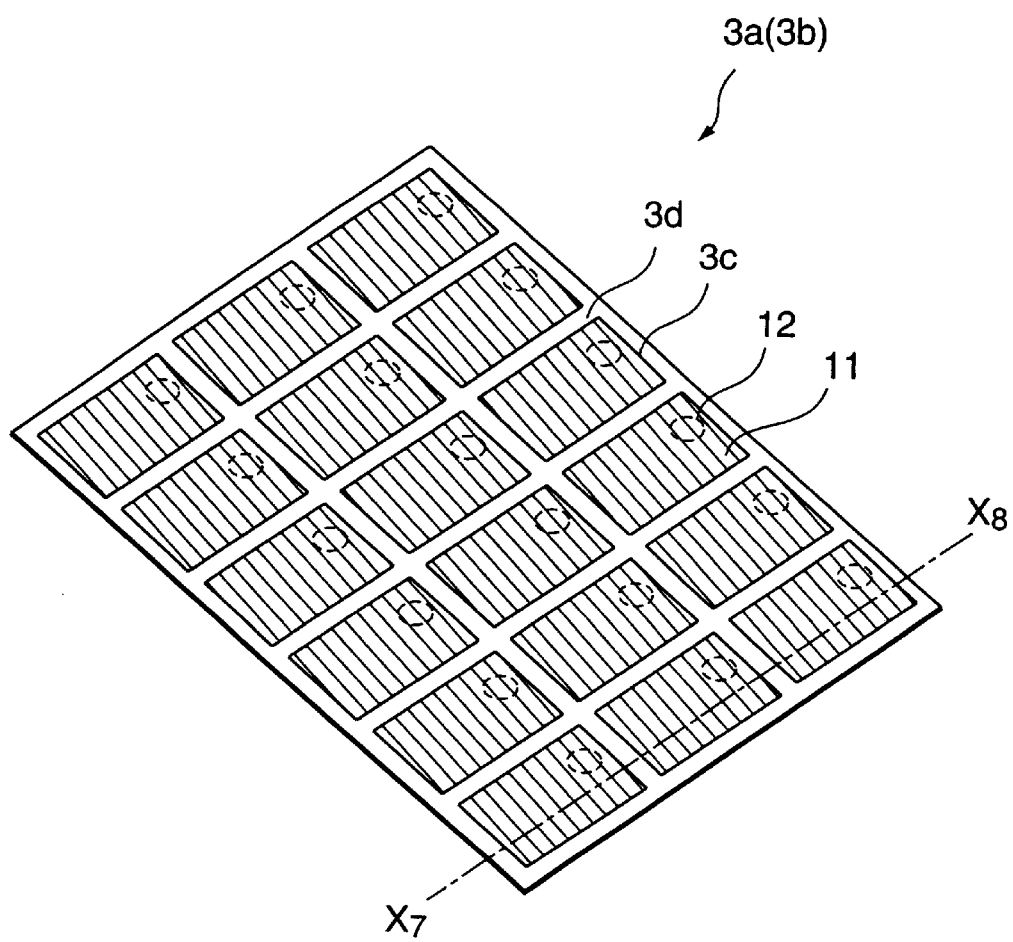
FIG. 21 is a perspective view indicating an appearance of an adhesive sheet on which uneven patterns made of small grooves are formed.

With reference to FIG. 21, an example of adhesive sheets 3a or 3b cut in a page size and having grooves formed into stripes thereon as its uneven pattern made of small grooves is shown. In FIG. 21, on one page size adhesive sheet 3a, 3b, there are formed 18 pieces of card patterns 3c (3×6=18), and a respective uneven pattern made of small grooves is formed separately corresponding to a respective card pattern 3c. In this example, as its uneven pattern made of small grooves, there are formed a surface texture pattern, grooves 11 of stripes and a recess 12 corresponding to the IC chip. The uneven pattern made of small grooves is formed larger than a card punching size by 3 mm to 5 mm, and spaced apart from each other with a dimensional pitch matching with a position of card punching.

Figure 22:
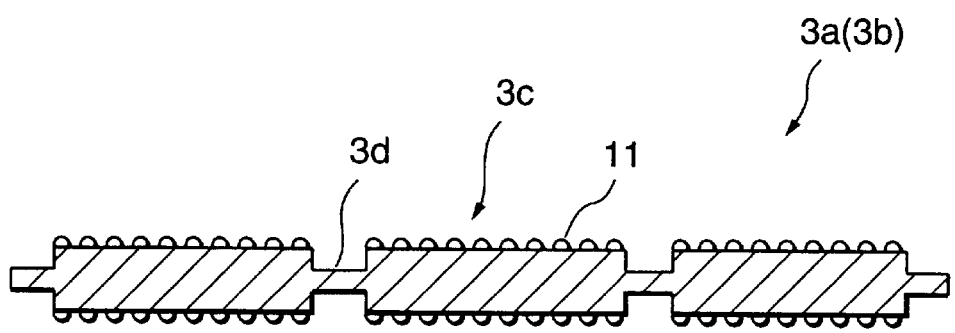
FIG. 22 is a cross-sectional view cut out along line X7–X8 in FIG. 21.

Further, as shown in FIG. 22, a respective card pattern 3c is formed in convexity, and on this card pattern, grooves 11 serving as the uneven pattern made of small grooves are formed in such a manner that their depth is lower than a height of compression bonding after the hot pressing. Still further, along four perimeter sides of the card pattern 3c, there are secured an air passage 3d for degassing.

As described above, the page size adhesive sheets 3a, 3b having the uneven pattern made of small grooves transcribed on their surfaces are obtained.

Figure 23:
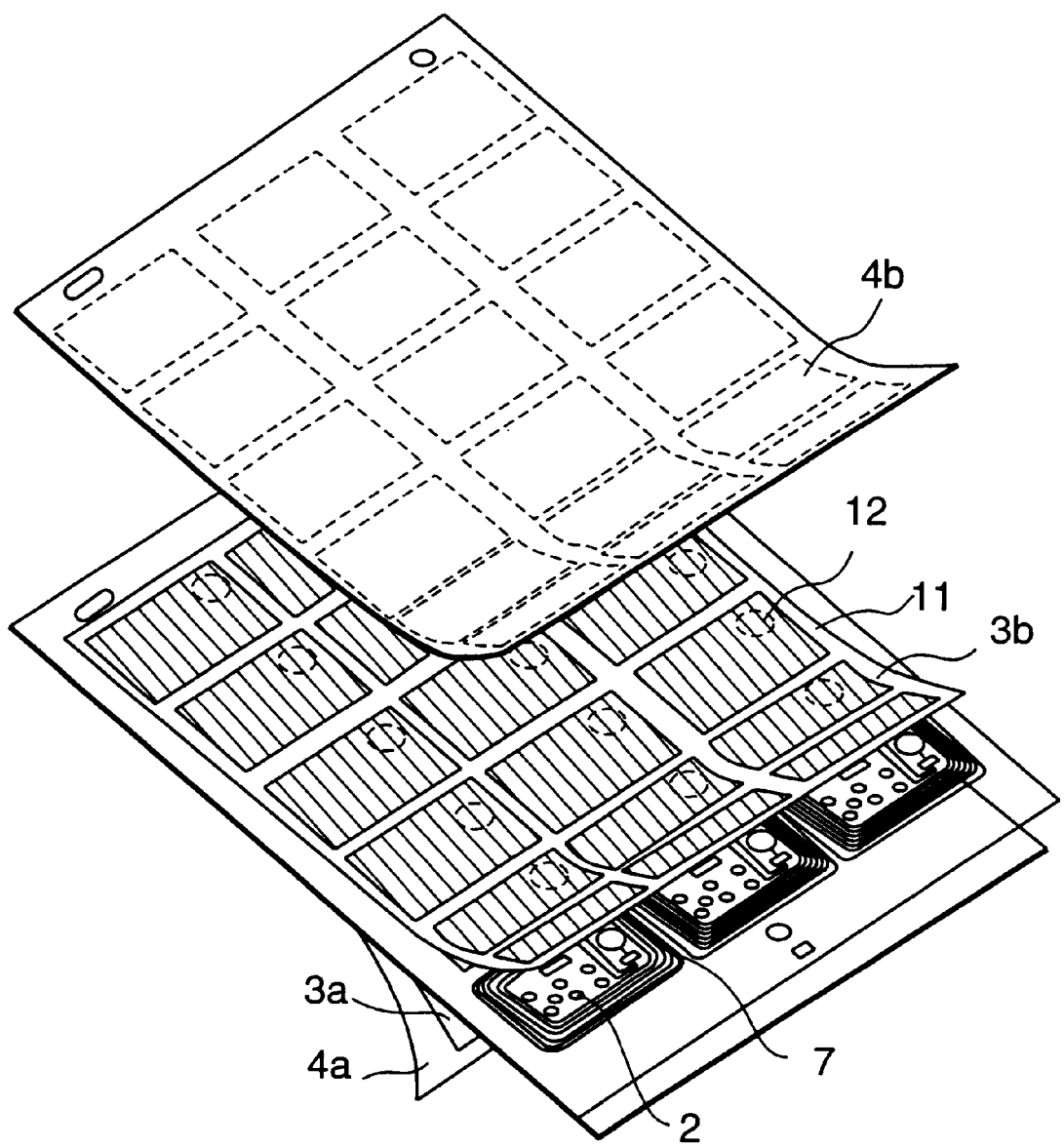
FIG. 23 is a perspective view indicating a state of lamination in which component members-in a leaf page size are laminated.

In the next figure, as shown in FIG. 23, an antenna substrate 2 cut in the page size on which antenna circuits 5 are formed in the card patterns corresponding to 18 pieces thereof in the adhesive sheets 3a, 3b and with IC chips mounted thereon is sandwiched between the adhesive sheets 3a and 3b of the page size as collated therebetween. Further, outer surfaces of the adhesive sheet 4a and 4b, respectively, as collated therebetween. These constitute the lamination component members.

Figure 24:
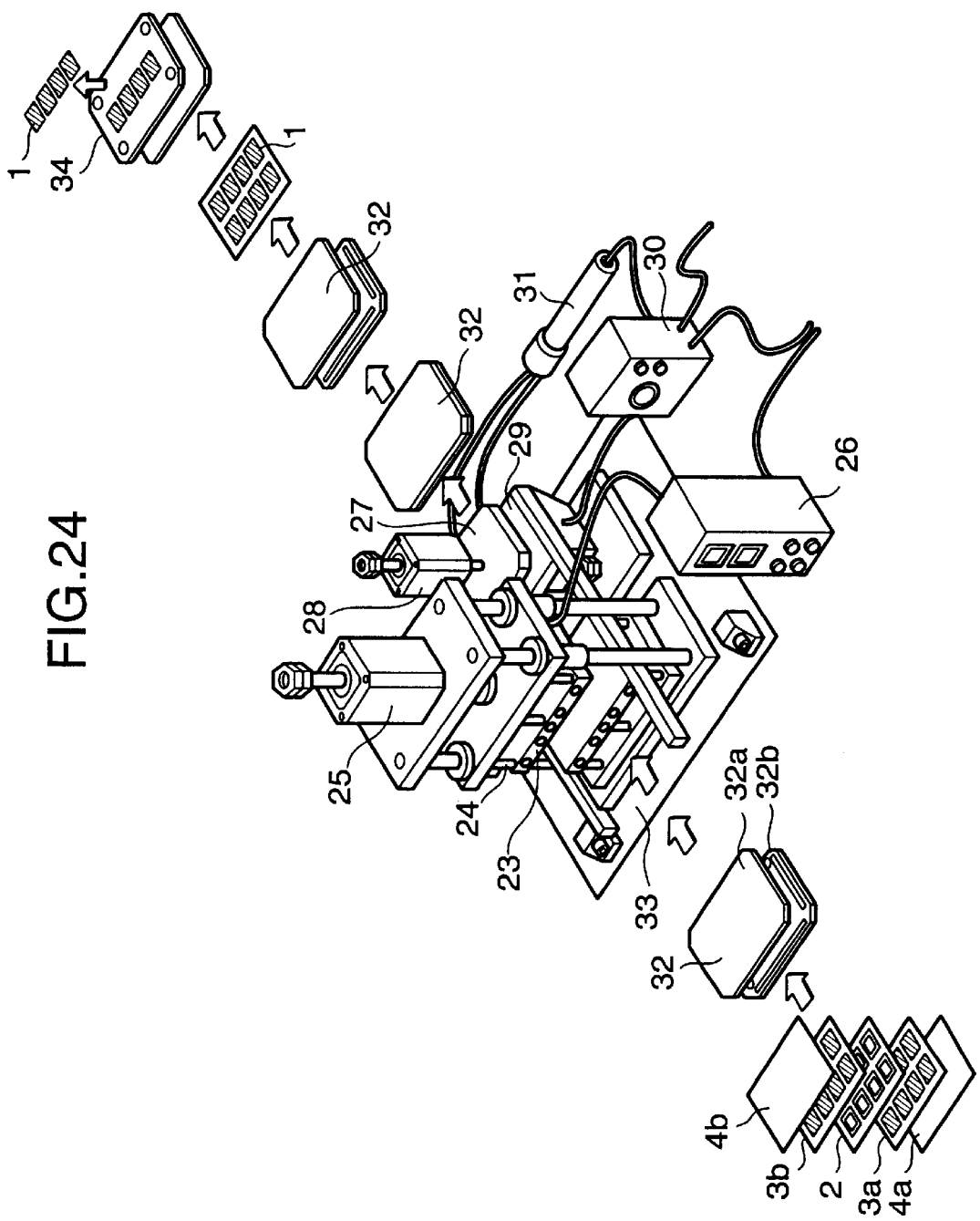
FIG. 24 is a diagram showing an example of hot press machines for bonding the lamination component members.

Then, as shown in FIG. 24, these lamination component members are set at a predetermined position on the lamination bonding plate 32. The lamination component members set up at the predetermined position on the lamination bonding plate 32 are preheated, for example, to 120° C. Upon completion of the preheating, the lamination bonding plate 32 is set immediately below the hot press stage 23.

Then, hot press plate 24 descends to make contact fully with the upper and the lower surfaces of the lamination bonding plate 32. By way of example, this hot press plate 24 is preheated and controlled at a preset hot press temperature. Then, the hot press plates 24 presses down the lamination bonding plate 32 to apply pressure on the lamination component members thus executing the hot press lamination bonding.

At this time, the residual air occluded between the component members is discharged passing through the air passage in the uneven pattern made of small grooves formed in the adhesive sheet member 3. In addition thereto, by applying a vacuum evacuation for 2 to 10 seconds from the lamination component members immediately prior to the hot pressing, its degassing effect can be enhanced.

The lamination bonding plate 32, upon completion of the lamination bonding in the hot press portion 23, is conveyed to cooling stage whole surface of the cooling plate 29 for quenching.

A card lamination bonded product upon completion of the lamination bonding is punched into a size of the card 1 with a card punching die, hence the IC card 1 is achieved.

As described hereinabove, by the providing the uneven pattern made of small grooves formed on the adhesive sheet member 3, the residual air remaining between the lamination component members can be discharged almost completely during the hot press processing, thereby eliminating almost completely the swelling from the surface of the card emerging due to the dispersed pneumatic foams of the residual air, and thereby enabling to obtain the excellent IC card 1 superior in the smoothness of the surface.

Figure 25:
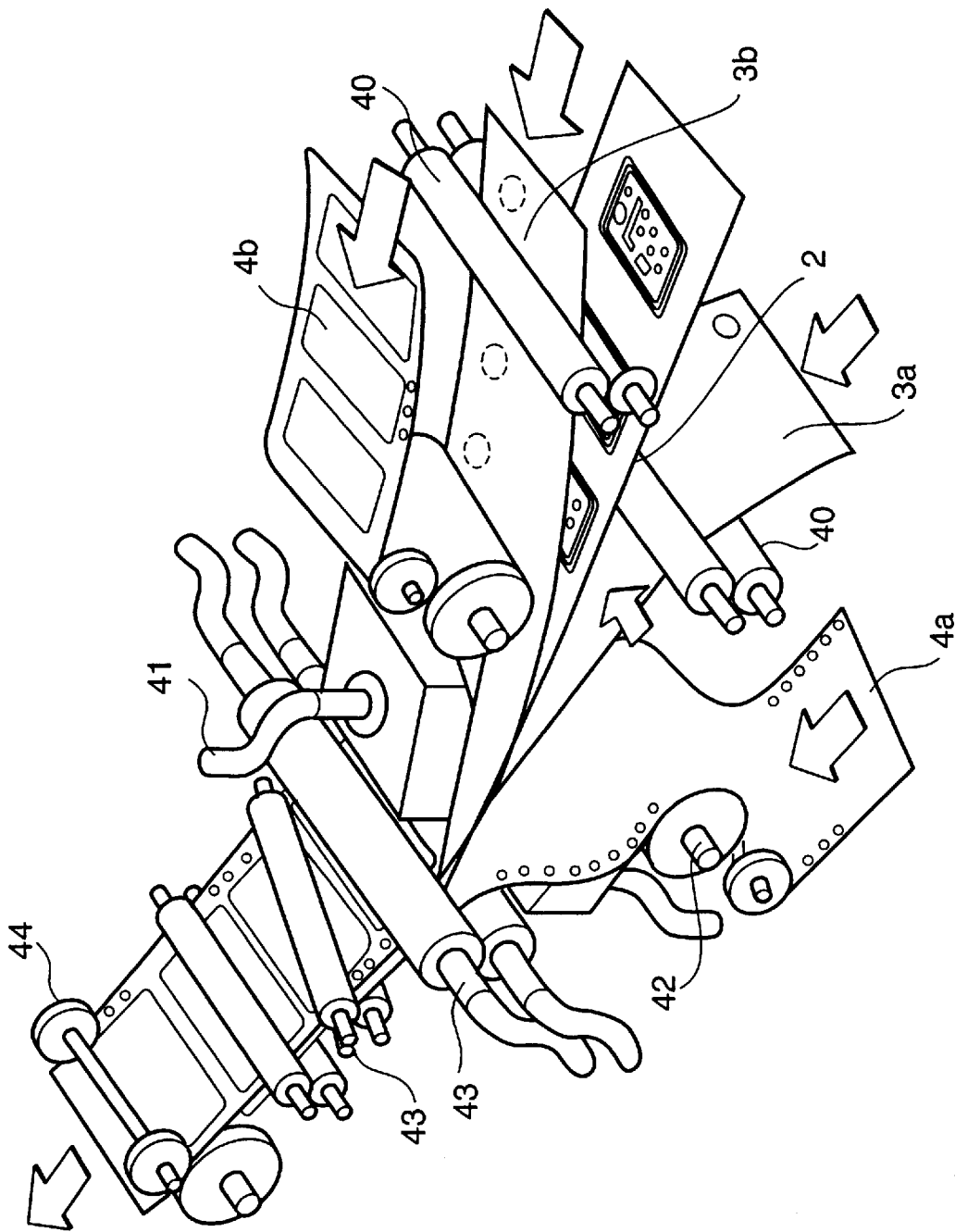
FIG. 25 is a diagram showing another example of the hot press machines for bonding the lamination component members.
Figure 26:
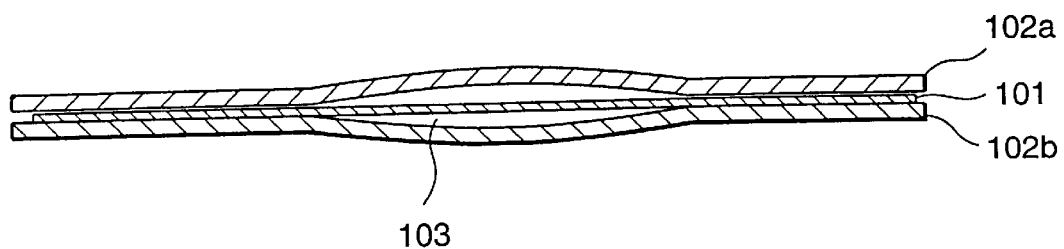
FIG. 26 is a cross-sectional view showing a state of a conventional IC card in which an air bubble is remained between the lamination component members.
Figure 27:
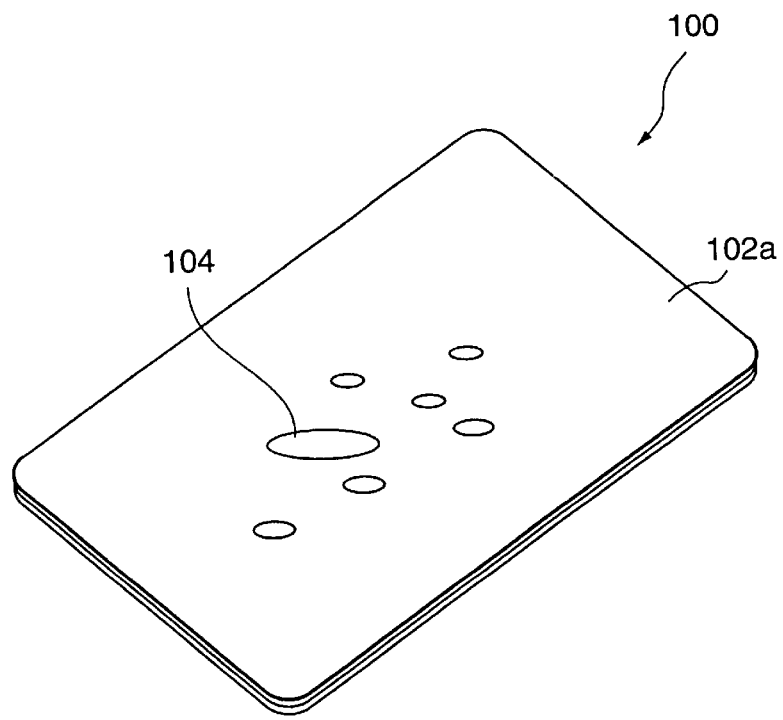
FIG. 27 is a perspective view showing a state of the conventional IC card in which a swelling is appeared in the surface of the card.

By way of example, in the foregoing description of the embodiment of the invention, an example of manufacturing the IC card using the component members cut in the page size is set forth, however, it is not limited thereto, and this invention can be also applied to :a method of manufacturing the IC card 1 as will be described in the following, using hooplike component members and an apparatus as shown in FIG. 25.

Firstly, an antenna substrate 2 in a hoop state is interposed between adhesive sheets 3a and 3b also in a hoop state by means of delivery rollers 40. This antenna substrate 2 and the adhesive sheets 3a, 3b are sent to a preliminary heater section 41. Concurrently, outer protection members 4a and 4b in a hoop which are provided to cover outer surfaces of the adhesive sheets 3a and 3b are fed in synchronization therewith to the preliminary heater portion 41 driven by sprocket rollers 42 so as to cover the outer surfaces of the adhesive sheets thereby constituting one of the lamination component members. These lamination component materials are preheated in the preliminary heater stage 41 to be softened in advance.

In the next, the lamination component members in the hooplike shape softened in advance in the preliminary heater portion 41 are bonded in lamination by hot pressing between nip rollers 43, hence a card lamination bonded product having a desired thickness is obtained. By the way, these nip rollers 43 are maintained at a preset temperature by a liquid heating medium such as oil or the like. Then, the card lamination bonded product thus obtained is conveyed to a card punching die machine (not shown) by a delivery sprocket roller 44 so as to be punched into a shape of the card 1, respectively by this card punching die machine, thus achieving the IC card of the invention.

Even in the case where the hoop-shaped component members are used as described above, by providing the uneven pattern made of small grooves formed on the adhesive sheet material 3, it is enabled almost completely to discharge the residual air occluded between the lamination component members during the hot pressing, and almost completely to eliminate the swelling from the surface of the card arising due to the dispersed pneumatic foams of the residual air after lamination bonding of the lamination component members, thereby achieving the IC card 1 superior in the smoothness of the surface.

According to the invention, by forming the uneven pattern made of small grooves on the adhesive sheets, it is enabled almost completely to discharge the residual air occluded between the lamination component members during the hot pressing, and almost completely to eliminate the swell to appear on the surface of the card due to the dispersed pneumatic foams of the residual air after the lamination bonding of the laminated components under the hot press, thereby obtaining the IC card superior in the smoothness of the surface thereof according to the invention.

Further, according to the invention, by use of the adhesive sheets for bonding the lamination component members, the vacuum degassing from the lamination members required for a long time (5 to 30 minutes) conventionally after collation of the lamination component members can be eliminated or shortened substantially to 2 seconds to 10 seconds. Still further, the adhesive sheet which has required a special handling with care conventionally can be handled as a general component member and can be assembled by a conventional part assembly method, thereby a substantial simplification of facilities and a reduction in a production design are expected to be achieved. Thereby, productivity and yield are improved because of the elimination of the occurrence of defects.

Still further, according to the invention, because the adhesive sheet can be manufactured to have any uneven pattern made of small grooves corresponding to any specific antenna circuit having a complicated arrangement of the IC card, any appropriate antenna circuit can be designed which ensures its antenna characteristics which is a critical factor for the IC card to be maintained without deterioration.

What is claimed is:

1. An integrated circuit card comprising:
   a substrate on which an integrated circuit chip and an antenna circuit are mounted; and
   a pair of films laminated on both surfaces of said substrate,
   wherein said pair of films have an uneven pattern made of small grooves formed at least on each surface thereof opposing said substrate for degassing.

2. The integrated circuit card as claimed in claim 1, wherein
   each of said films comprises an outer cover film and an adhesive film, and
   each of said adhesive films has said uneven pattern made of small grooves.

3. An integrated circuit card comprising:
   a substrate on which an integrated circuit chip and an antenna circuit are mounted; and a pair of films laminated on both surfaces of said substrate,
   wherein said pair of films have an uneven pattern made of small grooves formed at least on each surface thereof opposing said substrate for degassing; and
   wherein said uneven pattern on said film is formed substantially orthogonal relative to said antenna circuit.

4. The integrated circuit card as claimed in claim 1, wherein
   said uneven pattern made of small grooves is a texture pattern formed on the surface of said films.

5. The integrated circuit card as claimed in claim 1, wherein
   said uneven pattern made of small grooves comprises grooves with a stripe pattern.

6. The integrated circuit card as claimed in claim 5, wherein said grooves are formed on both surfaces of said films and arranged staggering alternately on said both surfaces.

7. An integrated circuit card comprising:
a substrate on which an integrated circuit chip and an antenna circuit are mounted; and a pair of films laminated on both surfaces of said substrate,
wherein said pair of films have an uneven pattern made of small grooves formed at least on each surface thereof opposing said substrate for degassing;
wherein said uneven pattern made of small grooves comprises grooves with a stripe pattern; and
wherein said grooves are formed to have an inclination so as gradually to deepen from inside to outside.

8. The integrated circuit card as claimed in claim 1, wherein
said film comprises a recess formed in a portion thereof corresponding to said integrated circuit chip.

9. An integrated circuit card comprising:
a substrate on which an integrated circuit chip and an antenna circuit are mounted; and a pair of films laminated on both surfaces of said substrate,
wherein said pair of films have an uneven pattern made of small grooves formed at least on each surface thereof opposing said substrate for degassing;
wherein said film comprises a recess formed in a portion thereof corresponding to said integrated circuit chip; and
wherein said recess is formed to have a conical shape at its bottom which gradually deepens from inside toward outside.

10. A method for fabricating an IC card having an IC chip and an antenna circuit mounted on a substrate which is interposed at least between a pair of films, the method comprising the steps of:
forming a degassing pattern on a surface of said films opposing said substrate; and
sealing said substrate by sandwiching said substrate with said films;
wherein said degassing pattern includes grooves; and said grooves are substantially formed orthogonal relative to said antenna circuit in said forming process.

11. A method for fabricating an IC card having an IC chip and an antenna circuit mounted on a substrate which is interposed at least between a pair of films, the method comprising the steps of:
forming a degassing pattern on a surface of said films opposing said substrate; and
sealing said substrate by sandwiching said substrate with said films;
wherein said degassing pattern is a texture pattern in said forming process.

12. A method for fabricating an IC card having an IC chip and an antenna circuit mounted on a substrate which is interposed at least between a pair of films, the method comprising the steps of:
forming a degassing pattern on a surface of said films opposing said substrate; and
sealing said substrate by sandwiching said substrate with said films;
wherein said degassing pattern includes grooves formed in a stripe in said forming process.

13. The method as cited in claim 12, wherein
said grooves are formed on both surfaces of said films and arranged staggering alternately on said both surfaces in said forming process.

14. The method as cited in claim 12, wherein
said grooves are formed to have an inclination so as gradually to deepen from inside to outside in said forming process.

15. A method for fabricating an IC card having an IC chip and an antenna circuit mounted on a substrate which is interposed at least between a pair of films, the method comprising the steps of:
forming a degassing pattern on a surface of said films opposing said substrate; and
sealing said substrate by sandwiching said substrate with said films;
wherein said film includes a recess formed in a portion corresponding to said IC chip in said forming process.

16. The method as cited in claim 15, wherein said recess is formed to have a conical shape at its bottom which gradually deepens from inside toward outside.

17. The integrated circuit card as cited in claim 1, wherein said integrated circuit card is a non-contacting card and has a rectangular shape of around 55 mm×85 mm.

18. An integrated circuit card comprising:
a substrate on which an integrated circuit chip and an antenna circuit are mounted; and a pair of films laminated on both surfaces of said substrate,
wherein said pair of films have an uneven pattern made of small grooves formed at least on each of said surfaces thereof opposing said substrate for degassing;
wherein each of said films comprises an outer cover film and an adhesive film, and each of said adhesive films has said uneven pattern made of small grooves; and
wherein said grooves formed on each of said adhesive films have a thickness of around 100 $\mu$m to 300 $\mu$m are 10 $\mu$m to 50 $\mu$m in depth and 1 mm to 5 mm in pitch.

19. The integrated circuit card as cited in claim 9, wherein said conical shape has 50 $\mu$m to 150 $\mu$m at bottom and 0 to 50 $\mu$m at its conical apex in depth.

* * * * *